United States Patent [19]

Huber

[11] Patent Number: 5,003,772

[45] Date of Patent: Apr. 2, 1991

[54] TURBO HYDRAULIC UNITIZED ACTUATOR

[75] Inventor: Jeffrey A. Huber, Rockford, Ill.

[73] Assignee: Sundstrand Corporation, Rockford, Ill.

[21] Appl. No.: 256,864

[22] Filed: Oct. 12, 1988

[51] Int. Cl.$^5$ .............................................. F02K 9/50
[52] U.S. Cl. ........................................ 60/259; 60/260
[58] Field of Search ......................... 60/259, 260, 257; 244/169, 164

[56] References Cited

U.S. PATENT DOCUMENTS

| | | | |
|---|---|---|---|
| 2,701,441 | 2/1955 | Mitchell | 60/259 |
| 2,911,912 | 11/1959 | Wetherbee, Jr. | 60/259 |
| 3,028,729 | 4/1962 | Ledwith | 60/259 |
| 3,049,870 | 8/1962 | Chamberlain | 60/260 |
| 3,062,004 | 11/1962 | Dooley et al. | 60/259 |
| 3,077,073 | 2/1963 | Kuhrt | 60/260 |
| 3,085,393 | 4/1963 | Hamlin, Jr. | 60/260 |
| 3,136,121 | 6/1964 | Barger et al. | 60/259 |
| 3,224,189 | 12/1965 | Kenny | 60/259 |
| 3,230,708 | 1/1966 | Huang et al. | |
| 3,446,437 | 5/1969 | McCullough et al. | |
| 3,532,304 | 10/1970 | Pyptiuk | |
| 4,140,290 | 2/1979 | Meier et al. | |
| 4,171,615 | 10/1979 | Stewart et al. | 60/259 |
| 4,585,191 | 4/1986 | Blount | |

Primary Examiner—Donald E. Stout
Attorney, Agent, or Firm—Antonelli, Terry, Stout & Kraus

[57] ABSTRACT

A propulsion system (10) having a propulsion engine (18) which combusts propellant received from a storage tank (12) in which a portion (14) of the tank contains propellant in a liquid state and in which an ullage (16) in a remaining portion of the tank contains the propellant in a gaseous state is disclosed. A first propellant circuit couples liquid propellant stored in the portion of the tank storing the propellant in a liquid state to an evaporator (22) for gasifying the liquid propellant. A second propellant circuit couples the gaseous propellant from the evaporator to the propulsion engine for combustion by the engine and to the ullage. A turbine (24) is disposed in the second propellant circuit coupling the gaseous propellant from the evaporator to the propulsion engine and to the ullage between the evaporator and the ullage for providing a power takeoff (26) powered by energy of the gaseous propellant flowing in the second circuit. The invention achieves a weight savings over the prior art auxiliary power unit and utilizes energy for direction control which previously had not been used for any purpose.

25 Claims, 7 Drawing Sheets

TURBO HYDRAULIC UNITIZED ACTUATOR

DESCRIPTION

1. Technical Field

The present invention relates to thrust vector control systems for rocket powered vehicles.

2. Background Art

FIG. 1 illustrates a block diagram of a prior art auxiliary power unit used for controlling the movement of control surfaces on a rocket. The auxiliary power unit 10 is comprised of a tank 12 storing hydrazine which is decomposed in a catalytic bed decomposition chamber 14 to produce high pressure gas which is applied to a turbine 16 which is designed especially for being powered by gas decomposition products produced by the decomposition of hydrazine. Shaft power from the turbine 16 is applied to a hydraulic pump which drives an actuator for producing motion to move the rocket engine bell to provide direction control. The hydraulic pump, actuator and engine bell are identified by reference numeral 18. The velocity of the turbine 16 is controlled by an in-line valve to prevent mechanical damage of the turbine. While the foregoing system has proven effective in providing direction control for rockets, there are a number of disadvantages consequent from the utilization of hydrazine as the fuel source in the auxiliary power unit 10. Hydrazine is difficult to store and handle. Furthermore, it is an expensive fuel source. The turbine which is driven by the decomposition products of hydrazine as stated above is required to be of a special design. The catalytic bed and decomposition chamber 14 is expensive. The overall aforementioned system is expensive. Furthermore, the auxiliary power unit 10 is a weight penalty as a consequence of the hardware in the system.

A need exists to reduce the weight and expense of the thrust vector control system in rockets as well as the difficulties involved with using a fuel other than the rocket propellant for powering the thrust vector control system. Furthermore, the foregoing system has distributed hydraulics which represents a disadvantage in weight and a potential service penalty as a consequence of the propensity of hydraulic systems to leak hydraulic fluid.

U.S. Pat. No. 4,585,191 discloses a propulsion system utilizing cyrogenic helium stored on board of a space craft for cooling an experiment package and for providing energy to satisfy in orbit propulsion requirements of the vehicle. This system expands the liquid helium into gaseous form which provides energy for thrust modules used for altitude compensation caused by atmospheric drag on the vehicle while it is in orbit. This system discharges the helium from the thrusters into space without any attempt to return the expanded helium to an ullage in the storage tank for the liquid helium.

U.S. Pat. No. 3,077,073 discloses a rocket having a turbine powered pump for pumping liquid hydrogen and liquid oxygen to the rocket. Liquid hydrogen is pumped into thermal contact with the rocket engine bell to expand it into gaseous form. A portion of the expanded hydrogen is used to power the turbine with a remainder of the expanded hydrogen being used for propulsion. The system of the '073 patent does not utilize power derived from the gaseous hydrogen to power a thrust vector control actuation system. Furthermore, the system of the '073 patent does not recirculate gaseous hydrogen into the liquid supply tank to maintain a controlled ullage.

The assignee of the present invention sells hydraulic transmissions which are comprised of a hydraulic pump and motor combination which are used in an integrated drive generator used for generating electrical power on an airframe. The hydraulic pump and motor combination and generator in an integrated drive generator are contained in a single case which minimizes problems with leakage as a consequence of the hydraulic pump and motor combination being immersed in hydraulic fluid.

DISCLOSURE OF INVENTION

The present invention is an improved thrust vector control actuation system. The invention has several advantages over the prior art described above with reference to FIG. 1. In the first place, the gas stream applied to the turbine has a relative low temperature as a consequence of it not being produced by the combustion or decomposition of fuel. Second, power for driving the thrust vector control actuation system of the present invention is derived without combustion or decomposition. The handling of liquid and gaseous hydrogen does not represent as substantial of a safety risk as hydrazine. Furthermore, the materials utilized in the thrust vector control actuation system of the present invention are not required to have the special properties required for a hydrazine powered auxiliary power unit such as that described in FIG. 1. Finally, the present invention represents a weight savings over the auxiliary power unit described with reference to FIG. 1.

A propulsion system having a propulsion engine which combusts propellant received from a storage tank in which a portion of the tank contains propellant in a liquid state and in which an ullage in the remaining portion of the tank contains the propellant in a gaseous form in accordance with the invention includes a first propellant circuit coupling liquid propellant stored in the portion of the tank storing the propellant in the liquid state to an evaporator for gasifying the liquid propellant; a second propellant circuit including a first portion coupling the gaseous propellant from the evaporator to the propulsion engine for combustion by the engine and a second portion coupling a gaseous propellant to the ullage; and a power takeoff, disposed in the second portion of the second propellant circuit, for providing a power takeoff powered by energy of the gaseous propellant flowing in the second portion of the second propellant circuit. The evaporator is thermally coupled to the propulsion engine to provide cooling for the engine during operation while the liquid propellant is gasified by the evaporator. A thrust vector control actuation system powered by the power takeoff is provided for moving the engine bell of the propulsion system to provide direction control movement of the propulsion system.

The power takeoff may include a turbine driven by gaseous propellant flowing in the second portion of the second propellant circuit and a hydraulic apparatus driven by the turbine which drives the thrust vector control system. The hydraulic apparatus may have at least one hydraulic pump driven by the turbine for providing pressurized hydraulic fluid at a hydraulic fluid output; and at least one hydraulic motor, coupled to the hydraulic fluid output, for driving the thrust vector control system. Furthermore, the invention may include a relief valve, coupled to the hydraulic fluid output for bleeding pressured hydraulic fluid from the hydraulic fluid output; a hydraulic fluid reservoir containing the at least one hydraulic fluid pump with a hydraulic fluid which is pressurized by the at least one hydraulic pump being drawn from the reservoir and returned to the reservoir from the at least one hydraulic motor; and a hydraulic circuit coupled to the relief valve for receiving hydraulic fluid bled by the relief valve and moving the bled hydraulic fluid thermally coupled to the second propellant circuit through a heat exchanger for transferring heat from the hydraulic fluid within the hydraulic circuit to gaseous propellant flowing in the second propellant circuit and returning the bled hydraulic fluid back to the reservoir. The heat exchanger includes an inner wall and an outer wall of the common case. A plurality of exhaust vanes are disposed in an exhaust passage for conducting exhaust gas from the turbine, the exhaust vanes separating the inner and outer walls. Alternatively, the hydraulic apparatus may include at least one hydraulic pump driven by the turbine for providing pressurized hydraulic fluid on a hydraulic fluid output; and a linear actuator coupled to pressurized hydraulic fluid provided by the at least one hydraulic pump for driving the thrust vector control system. A flow control valve may be disposed in the second propellant circuit for controlling the rate of flow of gasified propellant to the turbine to control a rate of power generated by the turbine. Preferably, a common case contains the turbine, the at least one hydraulic pump, the at least one hydraulic motor, and the thrust vector control.

A mechanism for testing the power takeoff may be provided. The mechanism for testing couples a source of pressurized gas to the power takeoff for testing operation of the power takeoff and for blocking the flow of gasified propellant to the power takeoff during testing. The mechanism for testing includes a shuttle valve coupled between a gas discharge of the power takeoff and the ullage for permitting gas discharged from power takeoff to be selectively conducted to the ullage or discharged to the ambient. The shuttle valve is coupled to a port which may be selectively coupled to the source of pressurized gas and to the second propellant circuit upstream from the power takeoff, pressurized gas at the port causing the shuttle valve to conduct gas discharged from the power takeoff to the ambient and pressurized gas in the second propellent circuit upstream of the power takeoff causing the shuttle valve to conduct gas discharged from the power takeoff to the ullage. A first check valve is disposed in the second propellant circuit upstream of the power takeoff for preventing gas flow from the power takeoff through the first check valve; and a second check valve is disposed between the source of pressurized gas and the second propellant circuit for preventing flow of gas from the second propellant circuit to the source of pressurized gas.

BEST MODE FOR CARRYING OUT THE INVENTION

Figure 2:
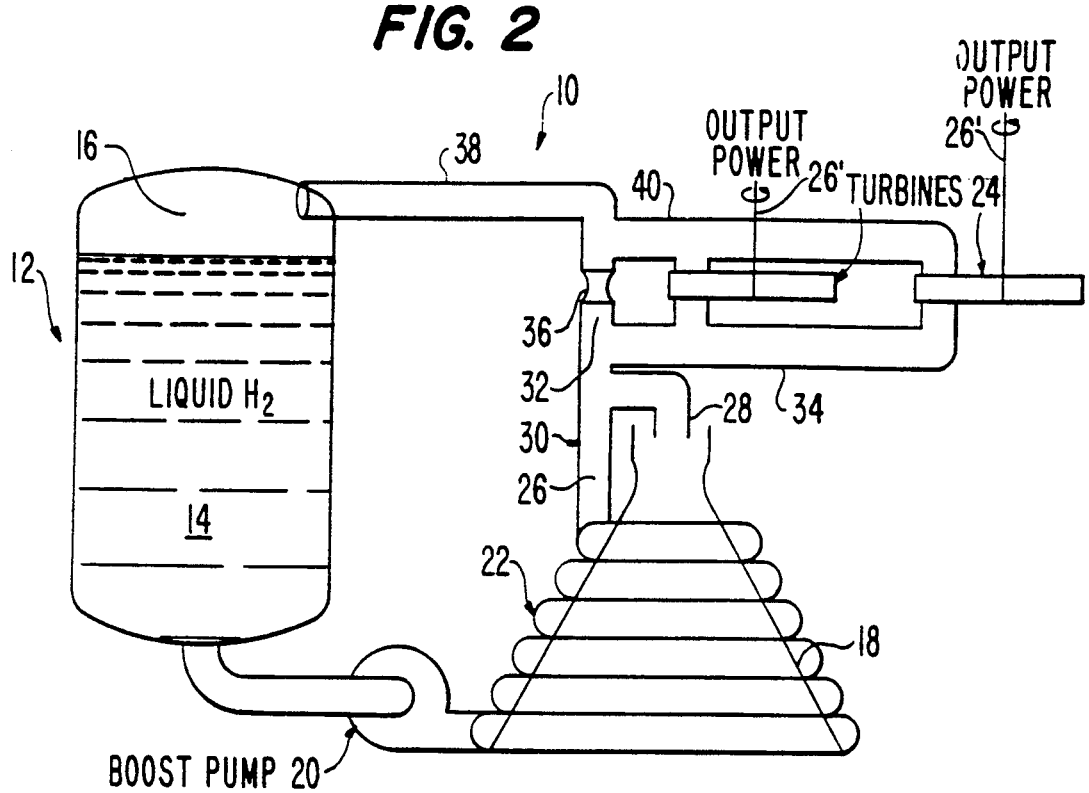
FIG. 2 illustrates a block diagram of a power takeoff in accordance with the present invention which is powered by gaseous propellant flowing back to a controlled ullage within a storage tank containing the liquid propellant.

FIG. 2 illustrates a block diagram of a power takeoff unit in accordance with the present invention which is powered by gasified propellant flowing back to the ullage in a storage tank. This system has the advantage that it is powered totally, without combustion or decomposition, by the flow of propellant which eliminates the disadvantages described above with regard to the prior art auxiliary power unit being powered by fuels which are not utilized for the main propulsion of a propulsion system. Furthermore, the invention derives power for controlling the vector control actuation system of a rocket from energy which was not utilized in prior art rockets. Conventional parts of a rocket engine have been omitted from the illustration for purposes of simplifying the illustration of the invention. The propulsion system 10 stores the fuel used for providing propulsive force and for providing power to the power takeoff in a storage tank 12. The tank has a portion 14 containing a liquid fuel such as $H_2$ and an ullage 16 to which expanded gasified propellant is returned in a controlled manner to maintain proper flow of the liquid fuel to the rocket engine 18 which is identified only schematically. It should be understood that the present invention may be utilized with any rocket engine having a thrust vector control actuation system in which liquid fuel is provided to the rocket engine 18 for combustion in gasified form with a gasified portion being returned to the ullage 16 to maintain proper delivery of the liquid fuel. The liquid fuel is pumped from portion 14 by a boost pump 20 of any conventional design. In one application of the invention, the boost pump may pressurize the liquid propellant to a pressure such as 3,000 PSI. The pressurized liquid propellant is applied to an evaporator 22 for purposes of cooling of the engine 18, gasification in preparation for combustion by engine 18 and return to the ullage 16, and providing energy for powering turbines 24 to produce output power on power takeoffs 26' which in a preferred embodiment is utilized to power a thrust vector control actuation system. However, alternatively the power takeoff may be utilized for providing power for other systems (not illustrated) within the propulsion system 10. A pair of turbines 24 and power takeoffs 26' are preferably utilized to respectively control the pitch and yaw of a rocket engine. Furthermore, for rockets with multiple engines, a pair of turbines 24 and power takeoffs 26 would be used for each engine. Multiple engines have been omitted for purposes simplifying illustration. The evaporator 22 has been illustrated as a coiled helix which is an intimate thermal contact with the outside of the engine bell of the rocket engine 18. However, in actual practice the evaporator 22 may be comprised of a manifold receiving the liquid propellant; a plurality of tubes joined to the manifold which extend along the longitudinal axis of the rocket bell in intimate thermal contact with the bell to absorb heat therefrom with the tubes being joined to a header which collects the propellant in gasified form. Expansion of the pressurized liquid propellant by the evaporator 22 performs cooling of the rocket engine bell. At discharge point 26 of the evaporator 22, the hydrogen is in a high pressure gaseous state such as 3,000 PSI. The main portion of the gaseous propellant flows from the output 26 of the evaporator 22 to the combustion chamber (not illustrated) of the rocket engine 18 through conduit 28. A much smaller portion of the gaseous propellant flows from the output 26 to conduit 30 which has bifurcated passages 32 and 34. The passage 32 contains a variable expansion valve 36 which reduces the hydrogen down to a pressure such as 220 PSI. Valve 36 increases the volume of the return gasified propellant to the ullage 16 to provide a minimum of mass flow necessary to maintain the ullage 16. Gasified propellant flows from the expansion valve 36 to the ullage 16 through conduit 38. Gasified propellant also flows through bifurcated section 34 to each turbine 24 where energy is removed from the flowing gasified propellant within section 34. After discharge from the turbine 24, the gaseous propellant flows through conduit 40 which joins conduit 38 to return gasified propellant which is discharged by the turbine to the ullage 16. Reduction of the temperature of the gas discharged by the turbine 24 is the only effect which must be considered in maintaining the necessary flow of gasified propellant to the ullage 16.

Figure 1:
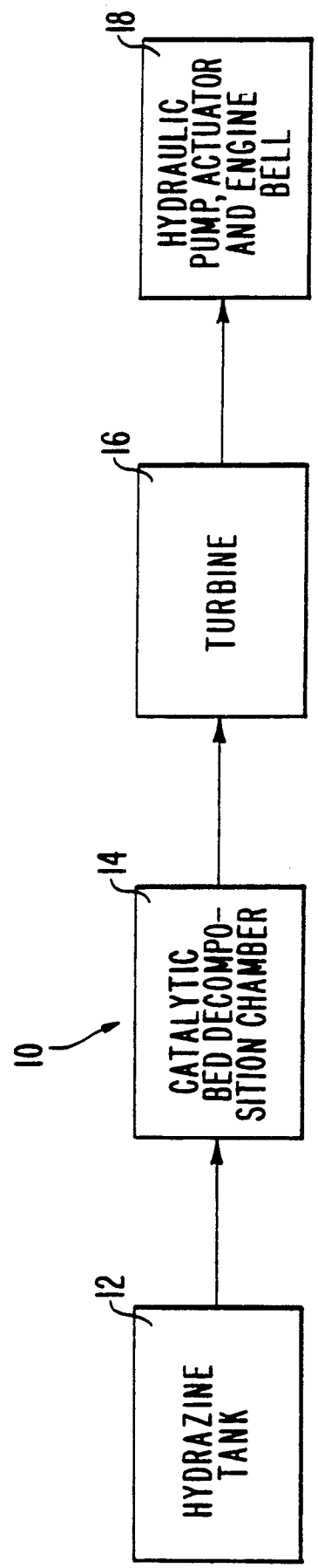
FIG. 1 illustrates a prior art auxiliary power unit for controlling the directional movement of the engine bell of a rocket.

The aforementioned system is highly advantageous because the propellant is handled at temperatures far below the decomposition temperature encountered with the auxiliary power unit described above with respect to FIG. 1, does not require combustion or decomposition to produce the power takeoff 26', the propellant does not present special safety concerns above those required for handling the main propellant for the rocket engine 18, and special materials are not required such as those required for the turbine present in the prior art apparatus of FIG. 1. Finally, a weight savings is achieved with the system of the present invention as illustrated in FIGS. 2-9 and may result in a weight savings of up to one-half of the total weight of the auxiliary power unit of the system of FIG. 1.

The actuation systems of the present invention may be mounted roughly parallel or perpendicular to the longitudinal axis of the rocket engine. One end of the actuator is mounted to the engine gimbeling frame (not illustrated) such that it is stationary with respect to the airframe. The other end is mounted to the exhaust nozzle such that forces exerted by the actuator cause the engine to pivot about its gimbel. Typically two actuators per engine are required. Each actuator is mounted 90° away from its counterpart such that one actuator controls rocket pitch and one actuator controls rocket yaw. A four engined vehicle would typically use a total of eight actuators.

Figure 3:
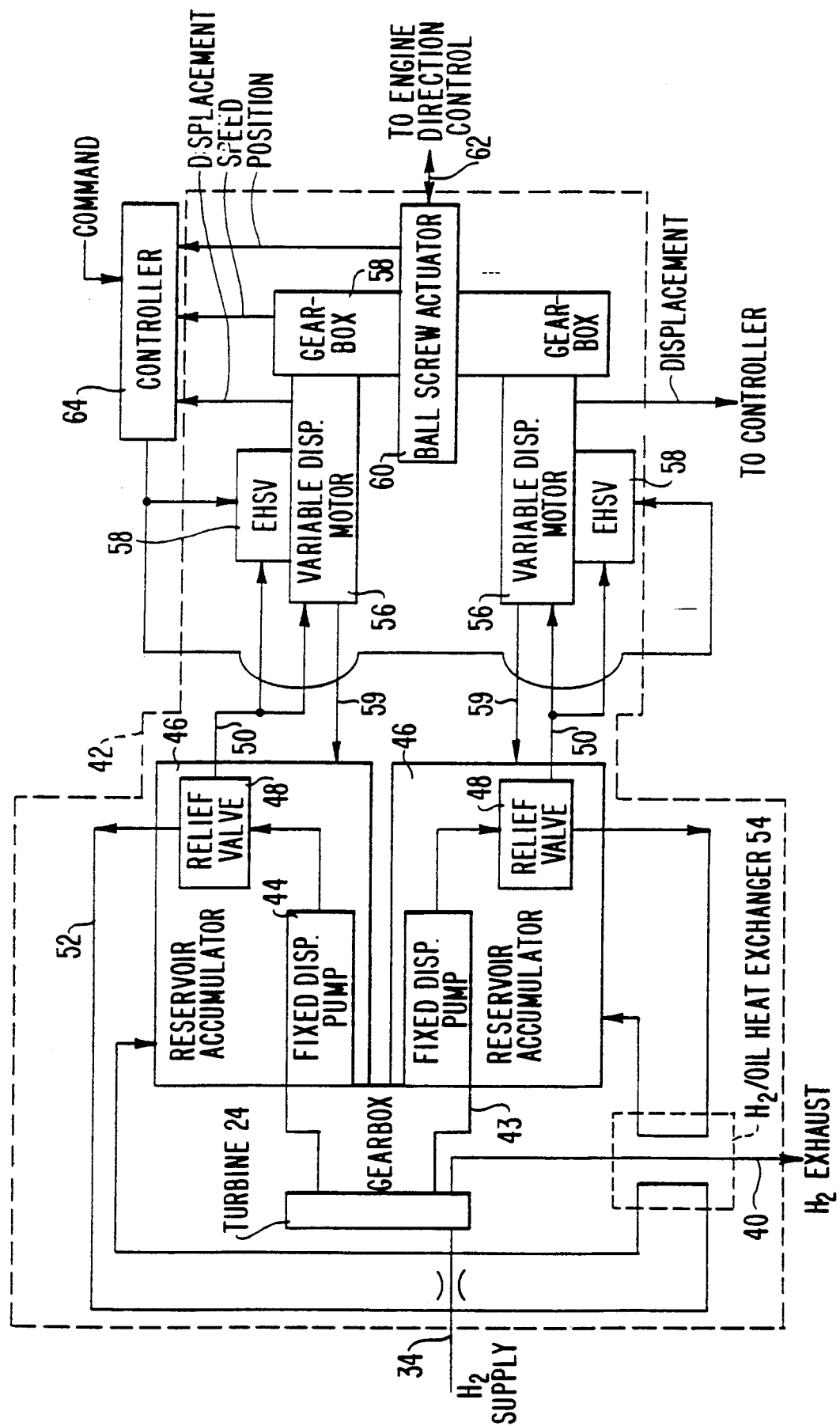
FIG. 3 illustrates a first embodiment of a thrust vector control actuation system powered by the system of FIG. 2.

FIG. 3 illustrates a first embodiment of a thrust vector control actuation system in accordance with the present invention. Like reference numerals identify like parts. The embodiment of FIG. 3 preferably contains the turbine and all hydraulic apparatus servo valves and ball screw actuation in a common case 42 with all high pressure hydraulic connections being internal to the case. The common case 42 reduces problems in handling pressurized hydraulic fluid including the propensity of individual hydraulic apparatus to leak. Each turbine 24, which may be of any conventional design, has an output shaft which drives the gearbox 43. The gearbox 43 has two outputs which respectively are joined to drive shafts of fixed displacement hydraulic pumps 44 which may be of any known design. The fixed displacement hydraulic pumps 44 are disposed within individual hydraulic fluid reservoirs 46 which provide take up hydraulic fluid which is pumped by the fixed displacement hydraulic pumps to relief valves 48. Each relief valve 48 provides constant pressure hydraulic fluid on output lines 50 and returns excess hydraulic fluid back to reservoir 46. This return is schematically illustrated by an external hydraulic line but it should be understood that in fact the return is directly into the interior of the case 42 without an exterior line. The regulated pressure of the relief valves 48 controls the speed of the turbine 24 and, therefore, the horsepower drawn from the flowing gasified propellant. Heat exchanger 54 transfers thermal energy from the excess hydraulic fluid to the exhaust propellant discharged from the turbine 24. A suitable embodiment of heat exchanger 54 is described below in conjunction with FIG. 9. The enthalpy of the hydraulic fluid is transferred to the exhaust gaseous hydrogen discharged from the turbine 16 in line 40 to reduce the requirements of the volume of hydrogen gas which must be returned to the ullage 16. The hydraulic lines 50 are coupled to variable displacement hydraulic motors 56 of conventional design. The variable displacement hydraulic motors 56 have a variable wobble plate of conventional design. A convention electrohydraulic servo valve 58 controls the position of the wobble plate in the variable displacement hydraulic motors 56 to regulate the shaft velocity of the output of the motors. Hydraulic fluid is returned to reservoirs 46 from the hydraulic motors 56 by hydraulic fluid return lines 59. Each of the output shafts of the variable displacement hydraulic motor 56 have a pinion (not illustrated). The pinions of the output shafts of the variable displacement hydraulic motors 56 drive a pinion gear (not illustrated) which is connected to a conventional ball screw actuator 60. The output 62 of the ball screw actuator is connected to the direction control of the rocket which are only indicated generally as a consequence of their usage in rockets being well known. A controller 64 controls the electrohydraulic servo valves 58 in response to a speed output from the gearbox 58, a position output from the ball screw actuator 60, a displacement output from the variable displacement motor 56 and a command input which specifies desired pitch and yaw for the propulsion system. It should be understood that the aforementioned hydraulic controller per se of the direction control of a rocket is conventional and forms no part of the present invention.

It should further be understood that the return of enthalpy to the $H_2$ exhaust line 40 from the turbine 24 is the simplest form of control of the energy drawn by the power takeoff of the present invention. In this form of control there is no throttling of the flow of hydrogen gas to the turbine which because of low temperatures, high pressure and required redundancy is a less advantageous form of control with the disadvantage being that a greater supply of hydrogen gas is required in the supply line 38 to maintain the velocity of the turbine 24 necessary to drive the vector control actuation system.

Alternatively, the system of FIG. 3 may be modified to use a fixed displacement motor having hydraulic flow to the motor controlled by an in-line electrohydraulic sensor valve (not illustrated) which permits the controller 64 to be eliminated. This system can be controlled by the commands used to control the prior art system described with reference to FIG. 1.

Figure 4:
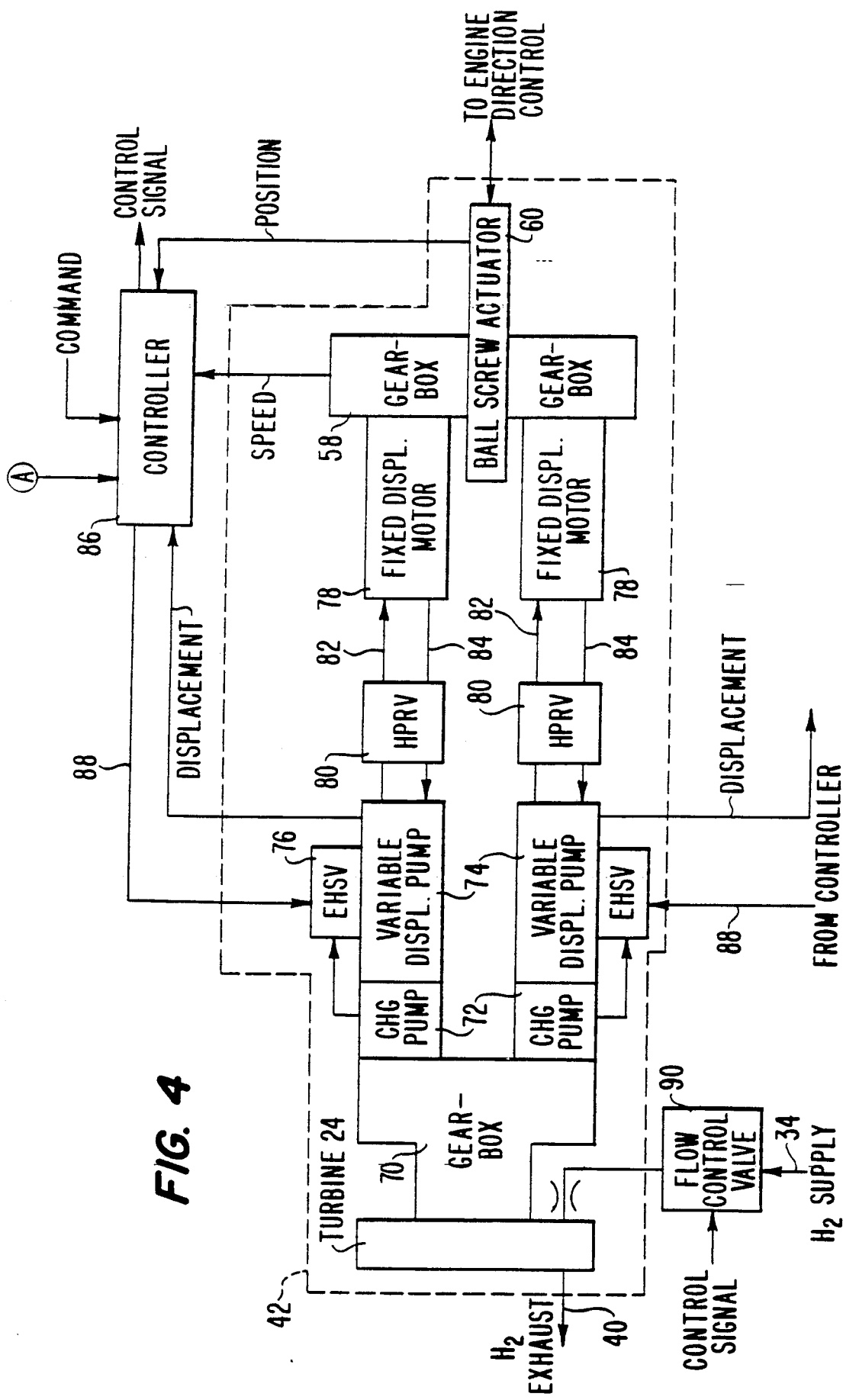
FIG. 4 illustrates a second embodiment of a thrust vector control actuation system powered by the system of FIG. 2.

FIG. 4 illustrates a second embodiment of the present invention. The embodiment of FIG. 4 differs from that of FIG. 3 principally in the nature of the hydraulic hardware and further that the regulation of the velocity of the turbine is controlled by a variable control valve disposed in the hydrogen gas supply line 34. Like reference numerals identify like parts. Turbine 24 drives an input shaft of gearbox 70 which has a pair of output shafts which respectively drive charge pumps 72 and variable displacement hydraulic pumps 74. The charge pumps 72 are necessary to provide hydraulic pressure for powering the electrohydraulic servo valve 76 of each variable displacement hydraulic pump 74 for varying the position of the wobble plate to vary the displacement of the pump. The output of each variable displacement hydraulic pumps 74 is applied an associated fixed displacement hydraulic motors 78 of conventional design. High pressure relief valves 80 are provided in the hydraulic lines 82 and 84 for safety purposes. Pressurized hydraulic fluid flows from each of the variable displacement pumps 74 to the fixed displacement motors 78 over hydraulic line 82 and from the motor to the pump over hydraulic line 84. The fixed displacement hydraulic motors 78 each have output shafts having a pinion gear driving a gearbox 58 and ball screw actuator 60 of an identical design to that described above with respect to FIG. 3. Controller 86 receives a speed input from gearbox 58 and a position input from ball screw actuator 60 and a command specifying a desired pitch and yaw for the propulsion system. The controller regulates the position of the electrohydraulic servo valve 76 via a command on line 88. The velocity of the turbine 24 is regulated by a flow control valve 90 disposed in supply line 34. The control signal input to the flow control valve 90 is outputted from the controller 86. The embodiment of FIG. 4 differs from the embodiment of FIG. 3 in that the volume of gaseous propellant applied to the turbine 24 is regulated to minimize the horsepower drawn by the power takeoff system from the gasified propellant flowing to the ullage 16. However, as discussed above with reference to FIG. 3, the flow control valve 90 can present problems as a consequence of the temperature and pressure of the gas in the supply line 34 and the requirement for redundancy in the control of the valve.

Figure 5:
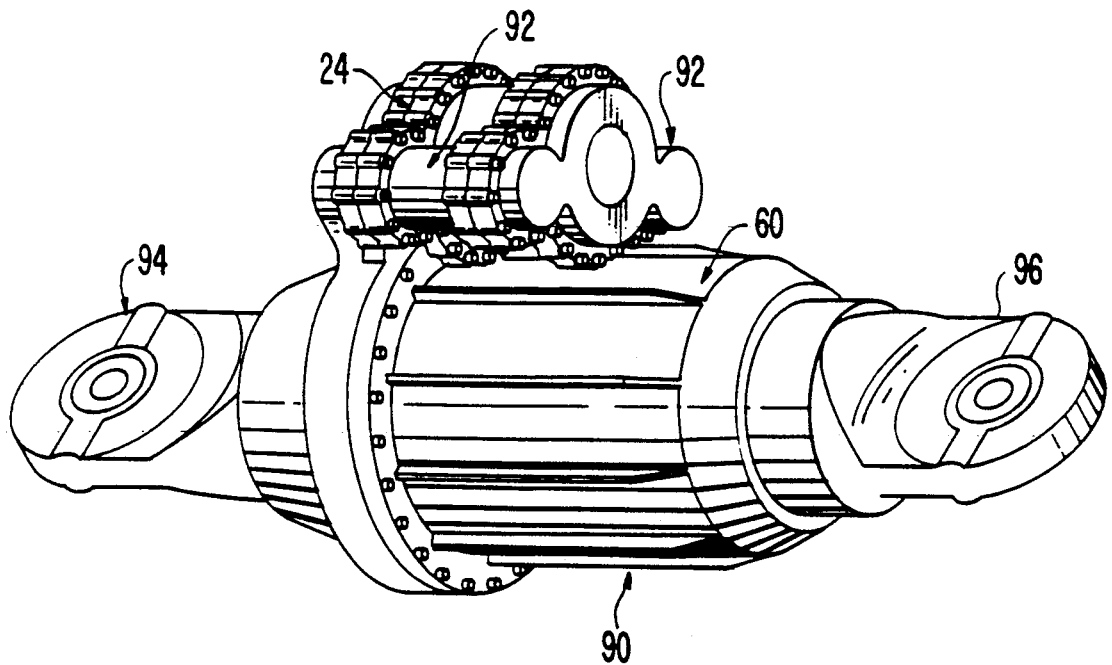
FIG. 5 illustrates a common case containing at least the turbine, hydraulic apparatus and actuator of the first and second embodiments of FIGS. 3 and 4.

FIG. 5 illustrates an embodiment of an integral case 90 which may be used to house the embodiments of the invention. Like reference numerals identify like parts. A hydraulic pump and motor combination 92 are joined to the output shaft (not illustrated) of the turbine 24. Output power from the hydraulic pump of the hydraulic pump and motor combination is applied to ball screw actuator 60 which has a fixed end 94 and a movable ball nut 96 which moves axially to vary the position of rocket engine direction control (not illustrated). The parts of the embodiments of the invention described in FIGS. 3, 4, 6, 7 and 8 are provided in the case 90.

Figure 6:
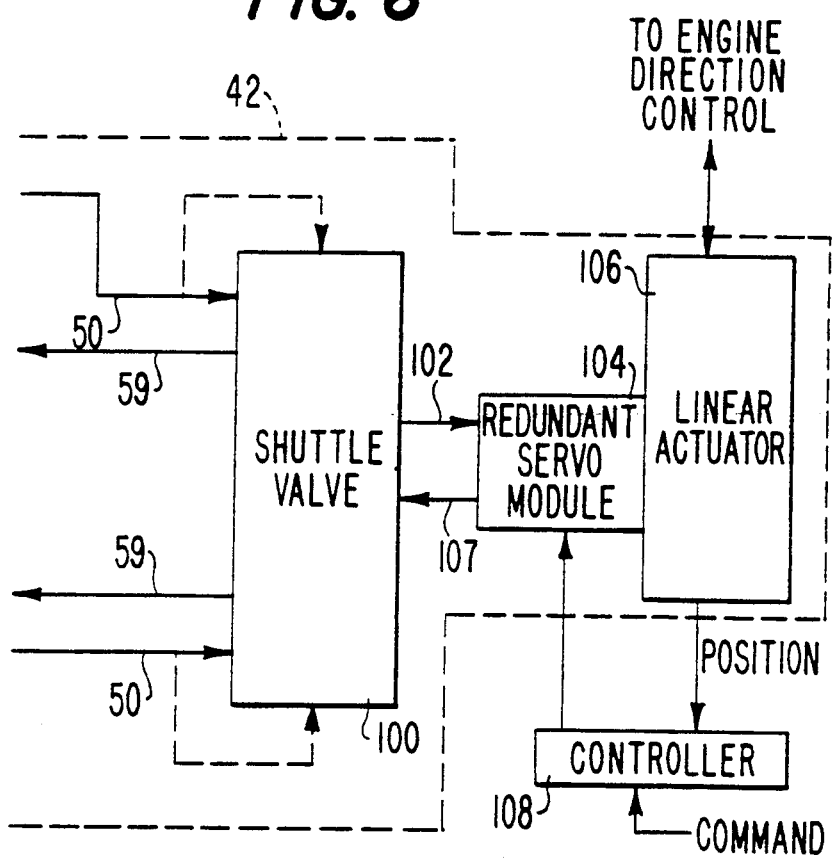
FIG. 6 illustrates a third embodiment of a thrust vector control actuation system powered by the system of FIG. 2.

FIG. 6 illustrates a third embodiment of the present invention. The third embodiment is identical to the first embodiment discussed above with reference to FIG. 3 with the exception of the matter illustrated therein. Like reference numerals in FIGS. 3 and 6 identify like parts. Pressurized hydraulic fluid provided from relief valves (not illustrated) is applied to shuttle valve 100 which has a movable spool therein to selectively couple pressurized hydraulic fluid from both of the fixed displacement pumps through the shuttle valve, hydraulic line 102, through redundant servo module 104 to a pair of ports (not illustrated) coupled to linear actuator 106. The redundancy is in the electrically powered portion of the servo module 104. Hydraulic fluid is returned to the shuttle valve 100 from the redundant servo module by hydraulic return line 107. If either of the high pressure hydraulic supply lines 50 is coupling a lesser pressure to the shuttle valve, the drop in pressure causes the movable spool to progressively couple pressurized hydraulic fluid from the other hydraulic line 50 as a function of the relative pressures on the two hydraulic lines. Hydraulic fluid is returned to reservoir accumulators (not illustrated) via hydraulic lines 59. Controller 108 in response to yaw and pitch commands modulates the relative amounts of hydraulic fluid coupled to the linear actuator 106 through the two ports of the redundant servo module to cause movement linearly in either of two directions to move the direction of the rocket. The shuttle valve 100, redundant servo module 104, linear actuator 106, and controller 108 are of a conventional construction.

Figure 7:
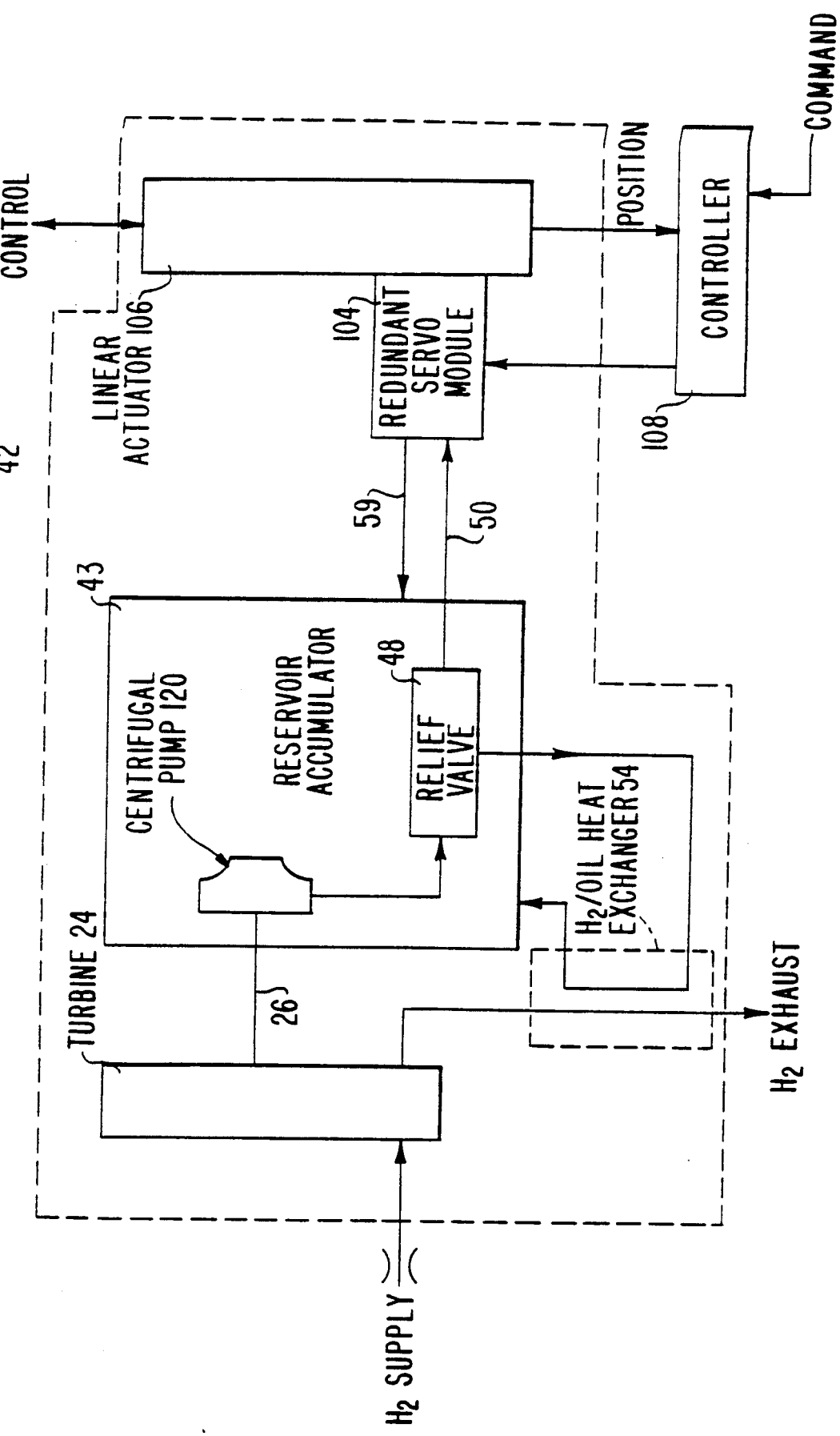
FIG. 7 illustrates a fourth embodiment of a thrust vector control actuation system powered by the system of FIG. 2.

FIG. 7 illustrates a fourth embodiment of the present invention. Like reference numerals identify like parts in FIGS. 2, 3, 6 and 7. Turbine 24 drives centrifugal pump 120 by means of power takeoff 26'. The centrifugal pump 120 takes in hydraulic fluid from reservoir accumulator 43 and pressurizes the hydraulic fluid which is applied to relief valve 48 and hydrogen/oil heat exchanger 54 in a manner described above with reference to FIG. 3. Pressurized hydraulic fluid is applied via hydraulic line 50 to redundant servo module 104 which functions in a manner identical to that described above with respect to FIG. 6. Hydraulic fluid is returned to reservoir accumulator 43 via hydraulic line 59. The redundant servo module 104 controls linear actuator 106 in a manner identical to that described above with respect to FIG. 6. Controller 108 functions in a manner identical to that described above with respect to FIG. 6.

Figure 8:
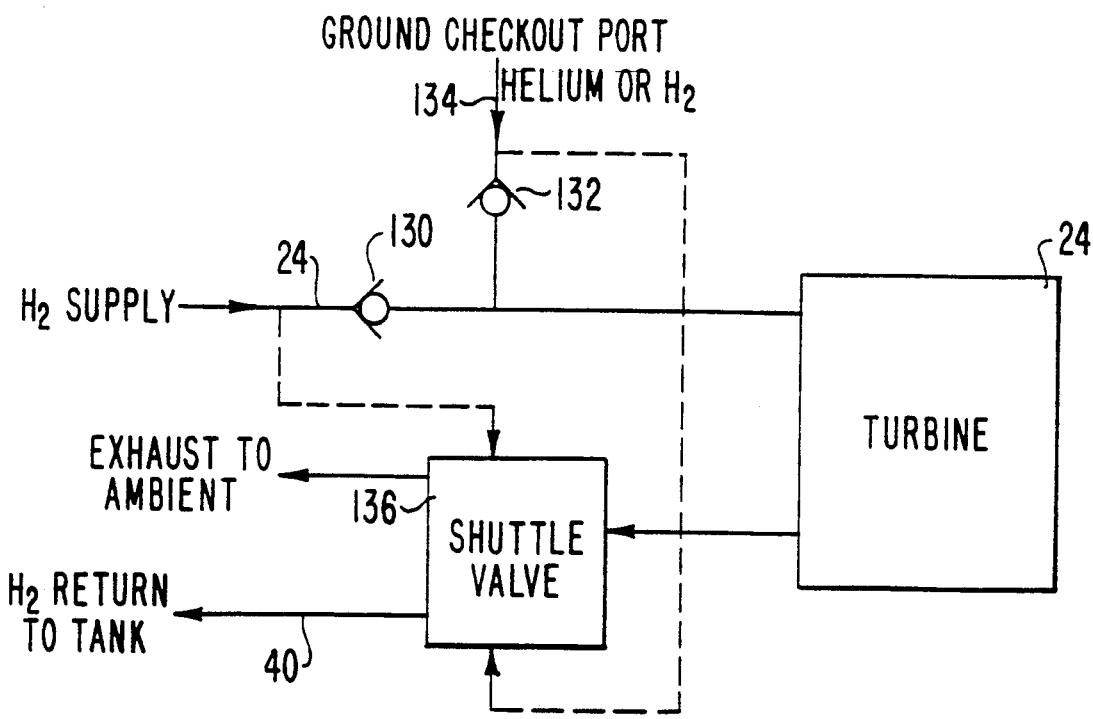
FIG. 8 illustrates a test pneumatic circuit which may be provided in one or more of the embodiments of the thrust vector control actuation system without requiring disconnection of the primary gasified propellant lines.

FIG. 8 illustrates a ground checkout system for determining the operability of the present invention. Like reference numerals in FIGS. 2 and 8 identify like parts. It should be understood that the ground checkout system of FIG. 8 is optional and is used to determine the operability of the turbine 24 and the return path to the ullage 16 of the tank 12. A check valve 130 is disposed in the gaseous supply line 24 to permit pressurized gaseous propellant to flow toward turbine 24 and to block the reverse flow. A check valve 132 is provided in an auxiliary gas line 134 which is coupled to a compressed source of helium or hydrogen gas. A shuttle valve 136 is coupled to the discharge of the turbine to permit selective venting of gas discharged by the turbine to the ambient or to the line 40 for return to the ullage 16 of tank 12. The shuttle valve 136 has first and second positions. The shuttle valve may be manually controlled or automatically controlled by providing gas lines connected to either end of the shuttle valve from the supply line 24 and the supply line 134 as indicated by dotted lines. When pressurized gas is on supply line 24, the shuttle valve 136 is caused to be positioned to cause gas discharged from the turbine 24 to be conducted to line 40. When pressurized gas is on supply line 134, the shuttle valve 136 causes the gas discharged from the turbine to be conducted to the ambient. With the ground checkout system of FIG. 8, the operation of the turbine may be checked while the present invention is contained in the assembly of a rocket without causing test gas to be conducted to the ullage 16 of the storage tank 12.

Figure 9:
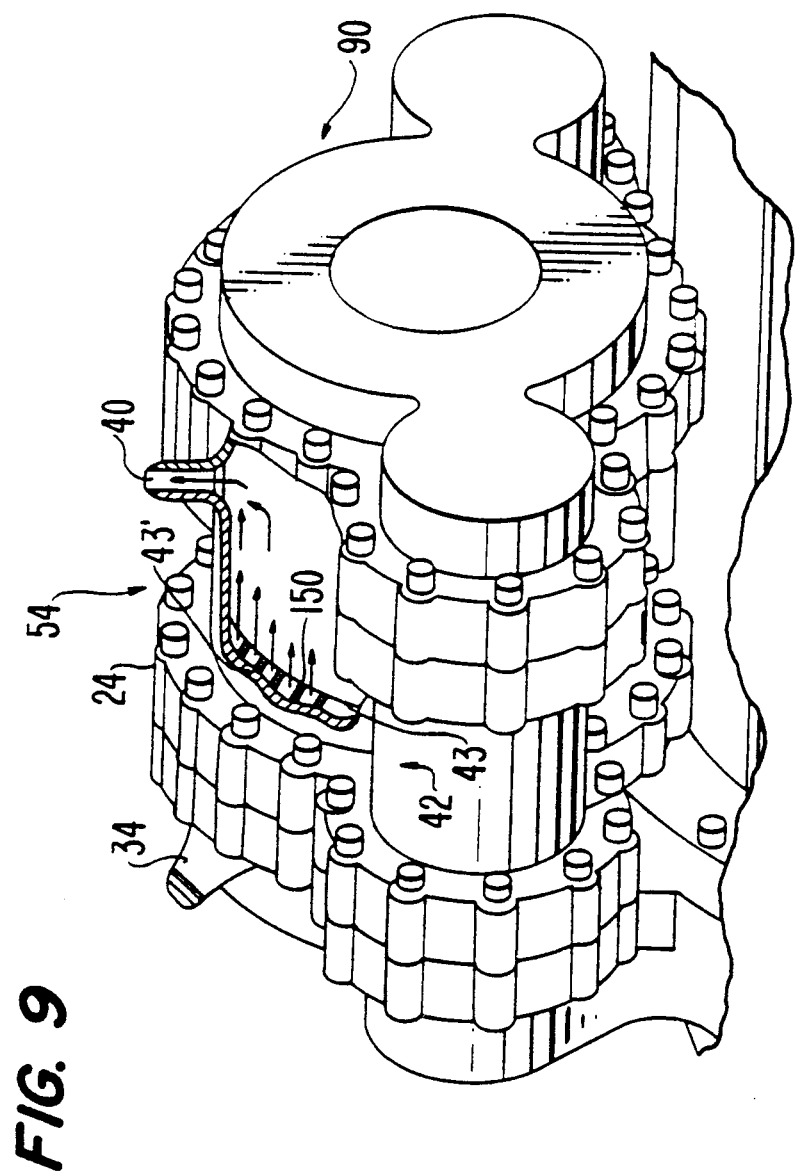
FIG. 9 illustrates an embodiment of a propellant/hydraulic fluid heat exchanger illustrated in FIGS. 3 and 7.

FIG. 9 illustrates a cutaway view of the case 90 of FIG. 5 which illustrates an embodiment of the heat exchanger 54 of FIGS. 3 and 7. Like reference numerals identify like parts in FIGS. 3, 5, 7 and 9. The heat exchanger 54 separates relatively high pressure gasified propellant flowing to the turbine 16 from the case interior which contains hydraulic fluid (not illustrated). Separation of the relatively high pressure propellant (from the hydraulic fluid) is accomplished by applying it directly to the exterior of the turbine 24 which is located at one end of the common case 42 which has an interior facing the reservoir of hydraulic fluid in the case 90. Interior wall 43 receives heat from the hydraulic fluid within the case and transfers heat to gasified propellant flowing in the relatively low pressure turbine exhaust in a direction parallel to exhaust vanes 150. The exhaust vanes 150 serve the dual purpose of increasing turbine efficiency and providing structural support between inner wall 42 and outer wall 43'.

While the invention has been described in terms of its preferred embodiments, it should be understood that numerous modifications may be made thereto without departing from the spirit and scope of the invention as defined in the appended claims. For example, while the preferred embodiment utilizes hydrogen as the propellant, it should be understood that the invention is not limited to any particular type of liquid propellant stored under conditions of controlled ullage. It is intended that all such modifications fall within the scope of the appended claims.

What is claimed is:

1. A propulsion system having a propulsion engine which combusts propellant received from a storage tank in which a portion of the tank contains propellant in a liquid state and in which an ullage in a remaining portion of the tank contains the propellant in a gaseous state comprising:
   a first propellant circuit coupling liquid propellant stored in the portion of the tank storing the propellant in a liquid state to an evaporator for gasifying the liquid propellant;
   a second propellant circuit including a first portion coupling the gaseous propellant from the evaporator to the propulsion engine for combustion by the engine and a second portion coupling gaseous propellant to the ullage; and
   at least one power takeoff disposed in the second portion of the second propellant circuit for providing a power takeoff powered by energy of the gaseous propellant flowing in the second portion of the second propellant circuit.

2. A propulsion system in accordance with claim 1 wherein:
   the evaporator is thermally coupled to the propulsion engine to provide cooling for the engine during operation while the liquid propellant is gasified by the evaporator.

3. A propulsion system in accordance with claim 1 further comprising:
   a thrust vector control actuation system powered by the power takeoff for moving a direction control of the propulsion system to provide direction control of movement of the propulsion system.

4. A propulsion system in accordance with claim 2 further comprising:
   a thrust vector control actuation system powered by the power takeoff for moving a direction control of the propulsion system to provide direction control of movement of the propulsion system.

5. A propulsion system in accordance with claim 3 wherein the power takeoff comprises:
   a turbine driven by gaseous propellant flowing in the second portion of the second propellant circuit; and
   a hydraulic apparatus driven by the turbine which drives the thrust vector control actuation system.

6. A propulsion system in accordance with claim 4 wherein the power takeoff comprises:
   a turbine driven by gaseous propellant flowing in the second portion of the second propellant circuit; and
   a hydraulic apparatus driven by the turbine which drives the thrust vector control actuation system.

7. A propulsion system in accordance with claim 5 wherein the hydraulic apparatus comprises:
   at least one hydraulic pump driven by the turbine for providing pressurized hydraulic fluid at a hydraulic fluid output; and
   at least one hydraulic motor, coupled to the hydraulic fluid output, for driving the thrust vector control actuation system.

8. A propulsion system in accordance with claim 7 further comprising:
   a relief valve, coupled to the hydraulic fluid output, for bleeding pressurized hydraulic fluid from the hydraulic fluid output;
   a hydraulic fluid reservoir containing the at least one hydraulic pump with hydraulic fluid which is pressurized by the at least one hydraulic pump being drawn from the reservoir and returned to the reservoir from the at least one hydraulic motor; and
   a hydraulic circuit, coupled to the relief valve for receiving hydraulic fluid bled by the relief valve and moving the bled hydraulic fluid through a heat exchanger thermally coupled to the second propellant circuit for transferring heat from hydraulic fluid within the hydraulic circuit to gaseous propellant flowing in the second propellant circuit and returning the bled hydraulic fluid back to the reservoir.

9. A propulsion system in accordance with claim 6 wherein the hydraulic apparatus comprises:
   at least one hydraulic pump driven by the turbine for providing pressurized hydraulic fluid at a hydraulic fluid output; and
   at least one hydraulic motor, coupled to the hydraulic fluid output, for driving the thrust vector control actuation system.

10. A propulsion system in accordance with claim 9 further comprising:
   a relief valve, coupled to the hydraulic fluid output, for bleeding pressurized hydraulic fluid from the hydraulic fluid output;
   a hydraulic fluid reservoir containing the at least one hydraulic pump with hydraulic fluid which is pressurized by the at least one hydraulic pump being drawn from the reservoir and returned to the reservoir from the at least one hydraulic motor; and
   a hydraulic circuit, coupled to the relief valve for receiving hydraulic fluid bled by the relief valve and moving the bled hydraulic fluid through a heat exchanger thermally coupled to the second propellant circuit for transferring heat from hydraulic fluid within the hydraulic circuit to gaseous propellant flowing in the second propellant circuit and returning the bled hydraulic fluid back to the reservoir.

11. A propulsion system in accordance with claim 8 wherein:
   the turbine, at least one hydraulic pump, at least one hydraulic motor, and the thrust vector control actuation system are contained in a common case.

12. A propulsion system in accordance with claim 11 wherein:
   the heat exchanger is disposed in the common case.

13. A propulsion system in accordance with claim 12 wherein:
   the heat exchanger includes an inner wall and an outer wall of the common case.

14. A propulsion system in accordance with claim 13 wherein the heat exchanger further comprises:
   a plurality of exhaust vanes disposed in an exhaust passage for conducting exhaust gas from the turbine, the exhaust vanes separating the inner and outer walls.

15. A propulsion system in accordance with claim 10 wherein:
   the turbine, at least one hydraulic pump, at least one hydraulic motor, and the thrust vector control actuation system are contained in a common case.

16. A propulsion system in accordance with claim 15 wherein:
   the heat exchanger is disposed in the common case.

17. A propulsion system in accordance with claim 16 wherein:
   the heat exchanger includes an inner wall and an outer wall of the common case.

18. A propulsion system in accordance with claim 17 wherein the heat exchanger further comprises:
   a plurality of exhaust vanes disposed in an exhaust passage for conducting exhaust gas from the turbine, the exhaust vanes separating the inner and outer walls.

19. A propulsion system in accordance with claim 5 wherein:
   the turbine, the hydraulic apparatus and the thrust vector control actuation system are contained in a common case.

20. A propulsion system in accordance with claim 5 wherein the hydraulic apparatus comprises:
   at least one hydraulic pump driven by the turbine for providing pressurized hydraulic fluid on a hydraulic fluid output; and
   a linear actuator, coupled to pressurized hydraulic fluid provided by the at least one hydraulic pump, for driving the thrust vector control system.

21. A propulsion system in accordance with claim 7 further comprising:
   a flow control valve, disposed in the second portion of the propellant circuit, for controlling the rate of flow of gasified propellant to the turbine to control a rate of power generated by the turbine.

22. A propulsion system in accordance with claim 1 further comprising:
   means, coupling a source of pressurized gas to the power takeoff, for testing operation of the power takeoff and for blocking the flow of gasified propellant to the power takeoff during testing.

23. A propulsion system in accordance with claim 22 further comprising:
   a shuttle valve, coupled between a gas discharge of the power takeoff and the ullage, for permitting gas discharged from the power takeoff to be selectively conducted to the ullage or discharged to the ambient.

24. A propulsion system in accordance with claim 23 wherein:
   the shuttle valve is coupled to a port which may be selectively coupled to the source of pressurized gas and to the second propellant circuit upstream from the power takeoff, pressurized gas at the port causing the shuttle valve to conduct gas discharged from the power takeoff to the ambient and pressurized gas in the second propellant circuit upstream of the power takeoff causing the shuttle valve to conduct gas discharged from the power takeoff to the ullage.

25. A propulsion system in accordance with claim 24 further comprising:
   a first check valve, disposed in the second propellant circuit upstream of the power takeoff, for preventing gas flow from the power takeoff through the first check valve; and
   a second check valve, disposed between the source of pressurized gas and the second propellant circuit, for preventing flow of gas from the second propellant circuit to the source of pressurized gas.

* * * * *